US 9,973,412 B2

United States Patent
Osborne

(10) Patent No.: US 9,973,412 B2
(45) Date of Patent: May 15, 2018

(54) METHOD AND SYSTEM FOR GENERATING ROUTING TABLES FROM LINK SPECIFIC EVENTS

(71) Applicant: Level 3 Communications, LLC, Broomfield, CO (US)

(72) Inventor: Eric Osborne, Sutton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 195 days.

(21) Appl. No.: 14/831,277

(22) Filed: Aug. 20, 2015

(65) Prior Publication Data
US 2017/0054625 A1 Feb. 23, 2017

(51) Int. Cl.
*G01R 31/08* (2006.01)
*H04L 12/755* (2013.01)
*H04L 12/741* (2013.01)
*H04L 12/759* (2013.01)
*H04L 12/703* (2013.01)

(52) U.S. Cl.
CPC .......... *H04L 45/021* (2013.01); *H04L 45/028* (2013.01); *H04L 45/28* (2013.01); *H04L 45/745* (2013.01)

(58) Field of Classification Search
CPC ... H04L 12/755; H04L 12/741; H04L 45/021; H04L 45/745; H04L 43/12; H04L 43/10; H04L 43/0847; H04L 12/26; H04L 12/757; H04L 12/721; H04L 5/12; H04L 45/023; H04L 45/12
USPC ............... 370/216–222, 238, 400, 398, 396, 370/254–257
See application file for complete search history.

(56) References Cited

U.S. PATENT DOCUMENTS

| | | | | |
|---|---|---|---|---|
| 6,744,775 B1* | 6/2004 | Beshai | ............... | H04L 45/02 370/395.31 |
| 7,756,049 B2* | 7/2010 | Chen | ............... | G06F 3/0605 370/252 |
| 8,264,962 B2* | 9/2012 | Vasseur | ............... | H04L 45/02 370/235 |
| 8,797,913 B2* | 8/2014 | Nandagopal | ............... | H04L 45/025 370/238 |
| 2006/0179158 A1 | 8/2006 | Randriamasy et al. | | |

(Continued)

OTHER PUBLICATIONS

International Search Report dated Oct. 4, 2016, Int'l Appl. No. PCT/US16/043491, Int'l Filing Date Jul. 22, 2016; 3 pgs.

(Continued)

*Primary Examiner* — Hanh N Nguyen

(57) ABSTRACT

Aspects of the present disclosure involve systems, methods, computer program products, and the like, for managing routes through a telecommunications network in response to a change of state of a link between components of the network. In particular, a router may determine the nature of the link event and the link upon which the event occurred. If the link event is on the same link or in some way related to a previously detected link event, the component may ignore the occurrence of the received link event in determining when the shortest route path is calculated. In this manner, a toggling link may be ignored by the router when applying a dampening effect to the calculation of the shortest route such that the network can respond to a singular link event faster than when a traditional dampening effect with exponential back-off is applied.

16 Claims, 4 Drawing Sheets

(56) References Cited

U.S. PATENT DOCUMENTS

2006/0274673 A1 12/2006 Fleury et al.
2008/0062862 A1 3/2008 Goyal et al.
2014/0362737 A1 12/2014 Beshai et al.
2016/0164770 A1* 6/2016 Liu ..................... H04L 45/023
370/254

OTHER PUBLICATIONS

Written Opinion of the International Searching Authority dated Oct. 4, 2016, Int'l Appl. No. PCT/US16/043491, Int'l Filing Date Jul. 22, 2016; 6 pgs.

International Preliminary Report on Patentability dated Feb. 20, 2018, Int'l Appl. No. PCT/US16/043491, Int'l Filing Date Jul. 22, 2016; 8 pgs.

* cited by examiner

METHOD AND SYSTEM FOR GENERATING ROUTING TABLES FROM LINK SPECIFIC EVENTS

FIELD OF THE DISCLOSURE

Embodiments of the present invention generally relate to systems and methods for implementing a telecommunications network, and more specifically for generating routing tables for use by the telecommunications network from events associated with one or more links in the network.

BACKGROUND

Telecommunication or other types of computer networks provide for the transmission of information across some distance through terrestrial, wireless or satellite communication networks. Such networks allow a user of the network to transmit the information, such as a telephone communication or computer data, over the network to another user of the network. To facilitate transmitting information across the network, one or more components of the network may determine a route through the network of components for transmitting the packet of information. The route may be determined by referencing one or more routing tables that includes information on a source component, a destination component, and one or more available paths between the components. However, in some instances, one or more available paths through the network may fail for some reason such that packets of information may no longer be transmitted along the route. In response, one or more of the components of the network may update their routing tables or generate new routing tables to reflect the change in the available routes through the network.

SUMMARY

One implementation of the present disclosure may take the form of a method for operating a telecommunications network. The method includes the operations of maintaining a link state database in a storage device, the link state database comprising a state of a plurality of links between a plurality of components of the telecommunications network, detecting a change in the state of at least a first of the plurality of links of the link state database at a first time, and applying an initial penalty time period for processing the change in the state of at least a first of the plurality of links of the link state database. The method may also include the operations of receiving an indication of a change in the state of at least a second of the plurality of links of the link state database at a second time, the second time occurring after the first time and during the initial penalty time period and processing the change in the state of the first of the plurality of links of the link state database and the change in the state of at least the second of the plurality of links of the link state database after the initial penalty time period when the first of the plurality of links of the link state database is the same link as the second of the plurality of links of the link state database.

Another implementation of the present disclosure may take the form of a telecommunications network a plurality of communication links between a plurality of components of the telecommunications network, a router receiving announcements from one or more of the plurality of components of the telecommunications network, each announcement comprising state information for a subset of the plurality of communication links, and a link state database maintained by the router storing the received state information for the plurality of communication links of the telecommunications network. Further, the router may, in response to receiving the announcements, detect a change in the state of at least a first of the plurality of communication links at a first time, apply an initial penalty time period for processing the change in the state of at least a first of the plurality of communication links, receive an indication of a change in the state of at least a second of the plurality of communication links at a second time, the second time occurring after the first time and during the initial penalty time period, and process the change in the state of the first of the plurality of communication links and the change in the state of at least the second of the plurality of communication links after the initial penalty time period if the first of the plurality of communication links is the same link as the second of the plurality of communication links.

Yet another implementation of the present disclosure may take the form of a router component of a telecommunications network. The router component includes a network communication port to receive an announcement over a telecommunications network, the announcement comprising state information of a plurality of links between a plurality of components of the telecommunications network, a processor, and a memory device in communication with the processor for storing one or more instructions. When the one or more instructions are executed by the processor, the router performs the operations of maintaining a link state database comprising received state information of the plurality of links between the plurality of components of the telecommunications network from at least the announcement, detecting a change in the state of at least a first of the plurality of links of the link state database at a first time, and applying an initial penalty time period for processing the change in the state of at least a first of the plurality of links of the link state database. In addition, the router may receive an indication of a change in the state of at least a second of the plurality of links of the link state database at a second time, the second time occurring after the first time and during the initial penalty time period and process the change in the state of the first of the plurality of links of the link state database and the change in the state of at least the second of the plurality of links of the link state database after the initial penalty time period when the first of the plurality of links of the link state database is the same link as the second of the plurality of links of the link state database.

DETAILED DESCRIPTION

Figure 1:
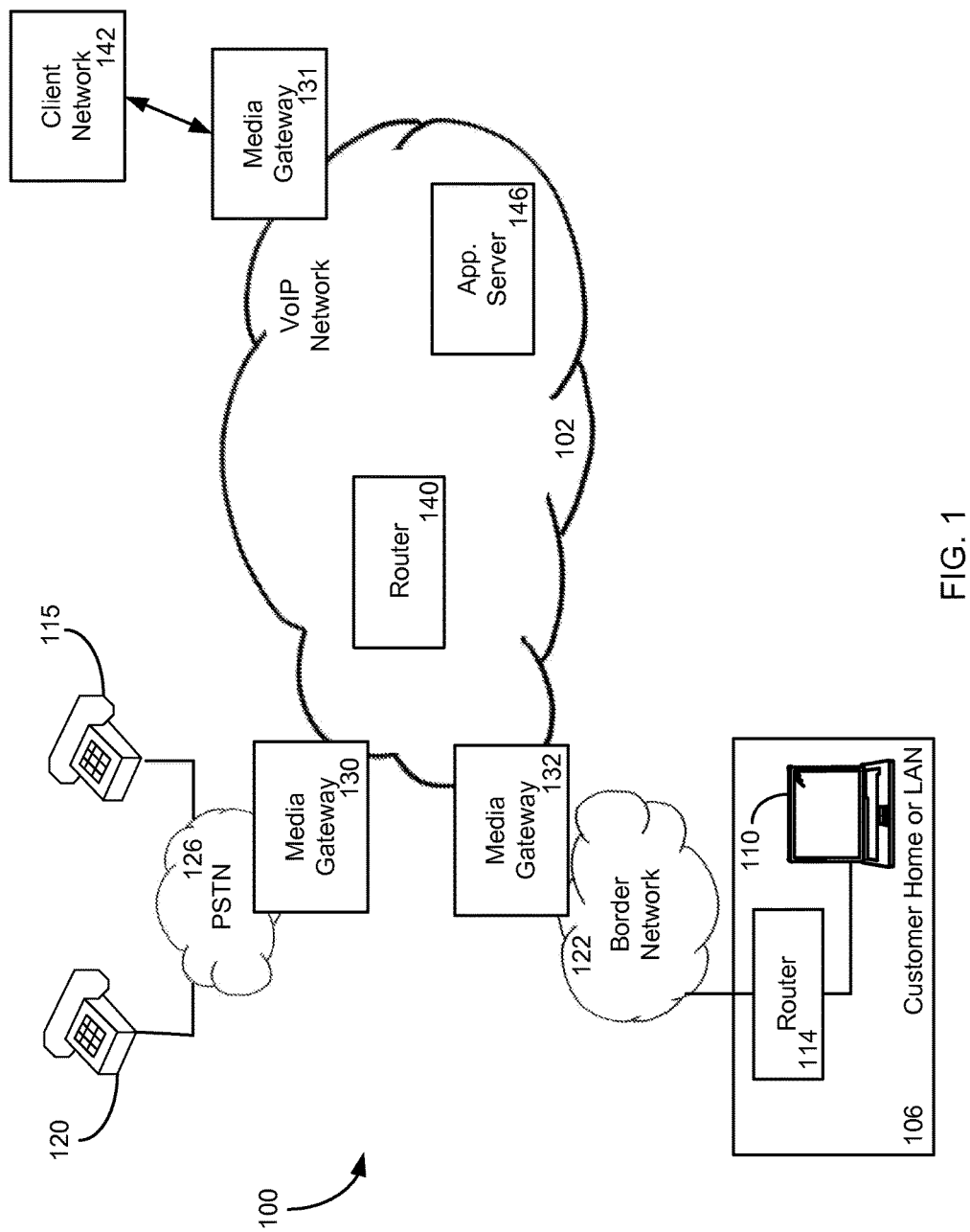
FIG. 1 is a schematic diagram illustrating an exemplary Voice over Internet Protocol (VoIP) operating environment in accordance with one embodiment.

Aspects of the present disclosure involve systems, methods, computer program products, and the like, for managing routes through a telecommunications network in response to a change of state of a link between components of the network. In particular, one or more components of the network may maintain a routing table, often referred to as a link state database, which includes all links between components of the network or a portion of the network. The link state database receives link or routing information to transmit packets through a telecommunications network. In some instances, a component of the network receives an indication of a change in state of a link in the database, such as an indication that a link is no longer available to transmit packets. The component may then utilize the change in state of the link when calculating a shortest path between two components of the network.

In one particular implementation, the component may employ a damping effect with an exponential back-off when responding to a change in a link state. For example, the component may delay calculating the shortest routing path through the network between two components for an initial penalty phase when a change in a link state is detected. After this initial penalty period, the component determines if any additional link state changes have occurred in the link state database. If additional changes are detected, the component may continue to add penalty periods before calculating the shortest routing path up to an upper threshold period of time. In one particular example, the addition of penalty periods may be added exponentially to the initial penalty period to the upper threshold. When the upper threshold period expires or no new link state changes are received, the component may update the link state database and calculate the shortest routing path utilizing the links of the current link state database. The damping effect with an exponential back-off may be performed by the component to prevent the component from consistently calculating the shortest routes based on the link state database and overburdening the processing power of the component.

In some instances, however, the continual addition of a penalty in response to a change in link state may be detrimental to the operation of the network. For example, the state of some links in the network may begin to toggle between present and not present in the advertised link states of components due to a malfunction of components associated with the link. Because the toggling of the link is a change in the link state every time it occurs, the components of the network may operate consistently in a penalty state and, oftentimes, calculate the shortest routes from the link state database only after the upper threshold period has elapsed. The operation of the components of the network with a delay penalty may slow down the transmission rate through the network to negatively affect the performance of the network.

Thus, another implementation of the present disclosure involves a system and/or method for responding to a change in a link state, otherwise referred to as a link event. Rather than applying a penalty period for each determined link event, this implementation determines the nature of the link event and the link upon which the event occurred. If the link event is unrelated to a previous link event, the component may calculate the shortest route from the link state database immediately or after an initial penalty phase. However, if the link event is on the same link or in some way related to a previously detected link event, the component may ignore the occurrence of the received link event in determining when the shortest route path is calculated. As such, the implementation effectively ignores a toggling link when applying a dampening effect to the calculation of the shortest route such that the network can respond to a singular link event faster than when a traditional dampening effect with exponential back-off is applied. The component response to a series of related link events on a particular link in the link state database may vary as desired by a network administrator, as explained in more detail below.

FIG. 1 illustrates an exemplary operating environment 100 for providing services to customers in a telecommunications network. In general, the environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. In general, these components operate to transmit packets across the network 102 from one component to another utilizing one or more routing tables. Thus, as used herein, a "network component" refers to any telecommunication component that maintains and/or utilizes a routing table to route one or more packets from the component to another component in the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102. Such collections of may be referred to as an "enterprise network" or simply an "enterprise".

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the portion of the customer network that connects to the network 102 through the TDM-based communication device 120, 115 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 131, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a telephone call to the network 102 from a telephone 120 associated with the network. Upon receipt, the network 102 routes the communication to a routing device 140 or routing devices integrated within the network 102. In one example, the routing devices may include a router 140 and/or an application server 146. It should be appreciated that the routing devices 140, 146 may be a part of the network 102, may be separate from the network, or may have portions deployed in the network and out of the network. In addition, routing devices 140, 146 may be resident on one or more components of the VoIP network, including several instances of the routing devices integrated throughout the network 102. Further, although only a single instance of the routing devices 140, 146 are illustrated in FIG. 1, any number of additional routing devices may be present in the network 102.

The router 140 is a routing device configured to route communications through the network 102. In particular, the router 140 may maintain or reference a routing table to determine how a packet is to be routed through the network. In many instances, the reference to the routing table may include referencing a link state database and calculating a shortest path from the router to a destination component in the network from the links listed in the link state database. As such, the link state database may include links between components and a "cost" for transmitting packets on the link. For example, the routing table may include a source location (such as "Chicago" in one example) for a component of the network, a next-hop location (such as "New York") associated with the source location through a particular link, and a cost for transmitting packets along the link between Chicago and New York. The cost may be a calculation of the total bandwidth, monetary cost, availability, and the like of the link between the components. By analyzing the entries in the link state database, a router may calculate a path from a source component to a destination component of the network and the related cost for transmitting a packet along that determined route. Many routers may then be configured to select a "shortest route" or "shortest path" first when selecting a routing path through the network, based on the cost associated with transmitting the path along the route. In this manner, the router may determine the path or route a received packet is transmitted through the network to the destination component.

In general, the link state database maintained or accessed by the router provides the links between components for the entire network or a portion of the network. The size of the network described by the link state database is configurable by an administrator of the network. To populate the link state database, a router may receive link state information from each other router in the network area described by the link state database. In other words, each entry in the link state database is a link received from another component of the network. In one particular implementation, one or more of the components of the network may announce their link states in an Interior Gateway Protocol (IGP) message. Such IGP messages may include Open Shortest Path First (OSPF) and Intermediate System to Intermediate System (IS-IS) protocols. As each router possesses information about the complete network topology, each router may independently calculate the best next hop for every possible destination in the network using routing information of the received network topology. The collection of best-next-hops determined from the received IGP information may be utilized to create the routing table for the router.

As mentioned above, some links listed announced in IGP messages may undergo link events. For purposes of this disclosure, the announcement of a new link between components of the network and/or the removal of a link between components as announced is considered a link event. However, any change in the state of a link may be considered a link event by the routers or other components of the network. For example, a change in the available bandwidth for a particular link may also be considered a link event. Thus, although the implementations of the present disclosure discussed below reference the state of link as present or not present as announced in IGP messages, any type of link event is contemplated and may be used to trigger one or more of the operations and/or methods discussed.

Figure 2:
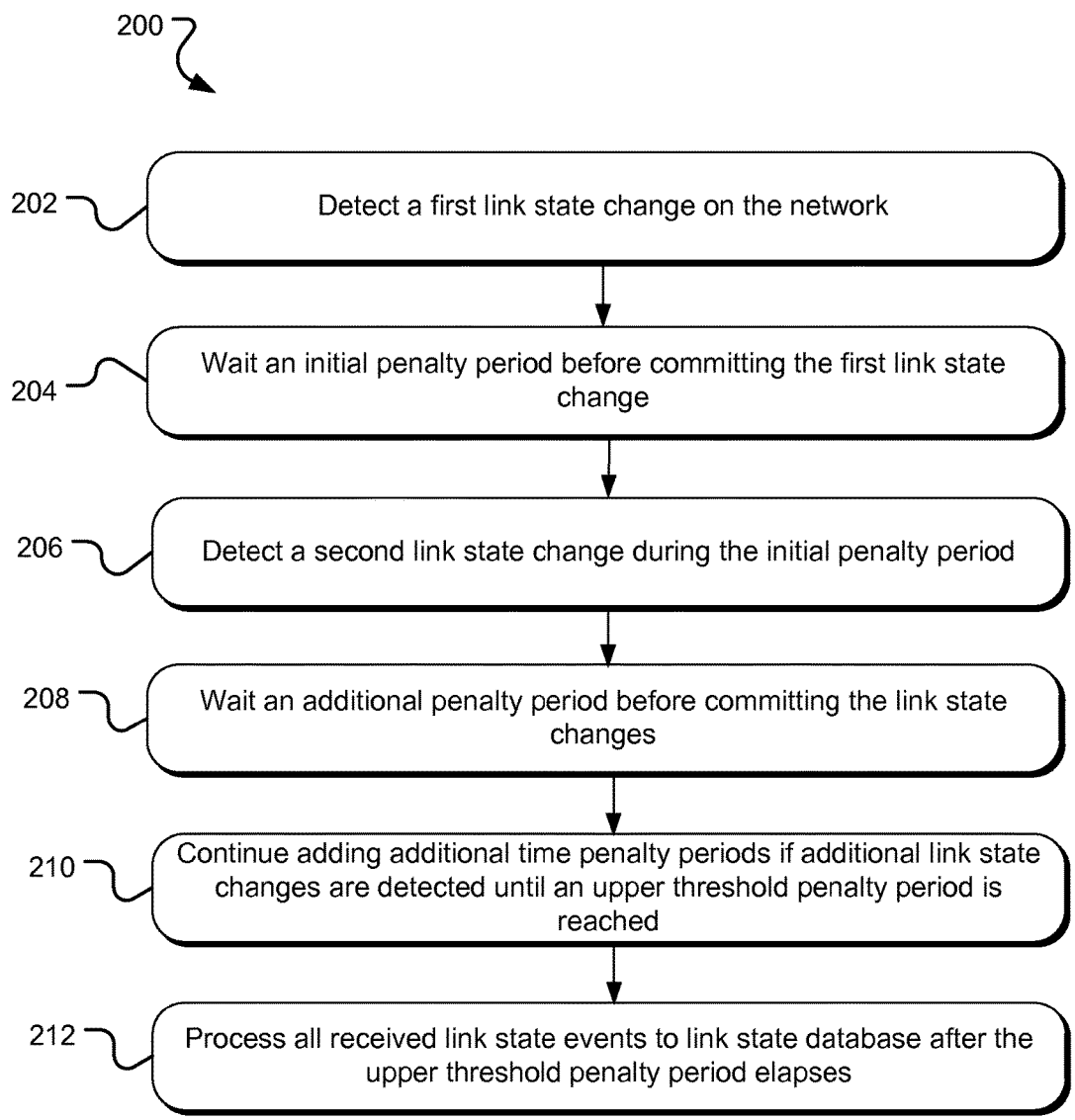
FIG. 2 is a flowchart illustrating a first method for a router of a telecommunications network to recalculate routing paths based on a link event.

FIG. 2 is a flowchart illustrating a first method 200 for a router of a telecommunications network to recalculate routing paths based on a link event. In the implementation described in FIG. 2, the router applies a damping effect with an exponential back-off when responding to a change in a link state. The operations of FIG. 2 may be performed by any component of a telecommunications network, such as a router. Beginning in operation 202, the router detects a first link state change on the network. As discussed above, the link state change may include a link going down or becoming available. Thus, to detect the link state change, the router may compare a received IGP message of the link states from a particular network component (or several network components) from a previously received IGP message of the link states. Upon comparison, the router may determine that a link that was previously announced is no longer present in the list of links in the IGP message, or a link that was not previously announced is now present in the IGP message. Such a change from one IGP message to the next may indicate a link state change.

In operation 204, the router may then apply an initial penalty period before reacting to the change in link state. In one particular implementation, the initial penalty period may be 100 ms, although any period of time may be set as the initial penalty period. The initial penalty period is an amount of time in which the router does not update the link state database and/or calculate a shortest path route for a packet on the network. Prior to the initial penalty period elapsing, the router may detect a second link state change in operation 206. The second link state change may or may not occur on the same link as the first link state change. Thus, regardless of which link the second link state change occurs, the router may detect the change in link state. Upon detection of this second link state change, the router may then apply an additional penalty period before committing to the detected link state changes in operation 208. In one particular example, the additional penalty period is 500 ms, although any time period may be set as the additional penalty period.

In operation 210, the router may continue adding additional penalty periods to committing a new link state table as additional link state changes are detected by the router. In one particular implementation, the additional penalty periods may be twice the previous penalty state such that the penalty periods increase exponentially. However, the period of time for any penalty period applied to the route calculation may be any period of time. The exponential increase in the penalty periods may continue, assuming that additional link state changes are detected, until an upper threshold penalty period is reached. In one particular implementation, the upper threshold penalty is 10 seconds, although the upper threshold penalty period may be for any period of time. In operation 212, the router may update the link state database with all of the announced links and use the updated link state database to calculate a route for a packet, after the upper threshold penalty period elapses. It should be appreciated that, once the router ceases to receive at least one change in a link state, the updating of the link state database and calculation of a route for a packet may occur once the penalty period has elapsed. The instance illustrated in FIG. 2 occurs if link state changes are received at the router throughout the upper threshold penalty period.

While the damping effect with an exponential back-off illustrated in FIG. 2 aids the network components from updating the link state database too often, other negative effects on the performance of the network may also occur. For example, one or more links of the network may toggle off and on rapidly due to a faulty connection between components or for other reasons. Such a toggling may continually drive all of the routers or components of the network into the upper threshold penalty period as each toggle of the link state for that particular link adds a new penalty period for the router. Delaying of the processing of routes and links for every component for the upper threshold penalty period may slow down the performance of the network due to a single link in the network having a faulty connection. Thus, in one implementation of the present disclosure, a router or other network component may ignore repeated link states changes on a particular link or other types of related link state changes when applying a penalty period in response to a received link state change. By ignoring related link state changes, the network components may still respond to changes in link states, without being driven to the maximum penalty period for a toggling link.

Figure 3:
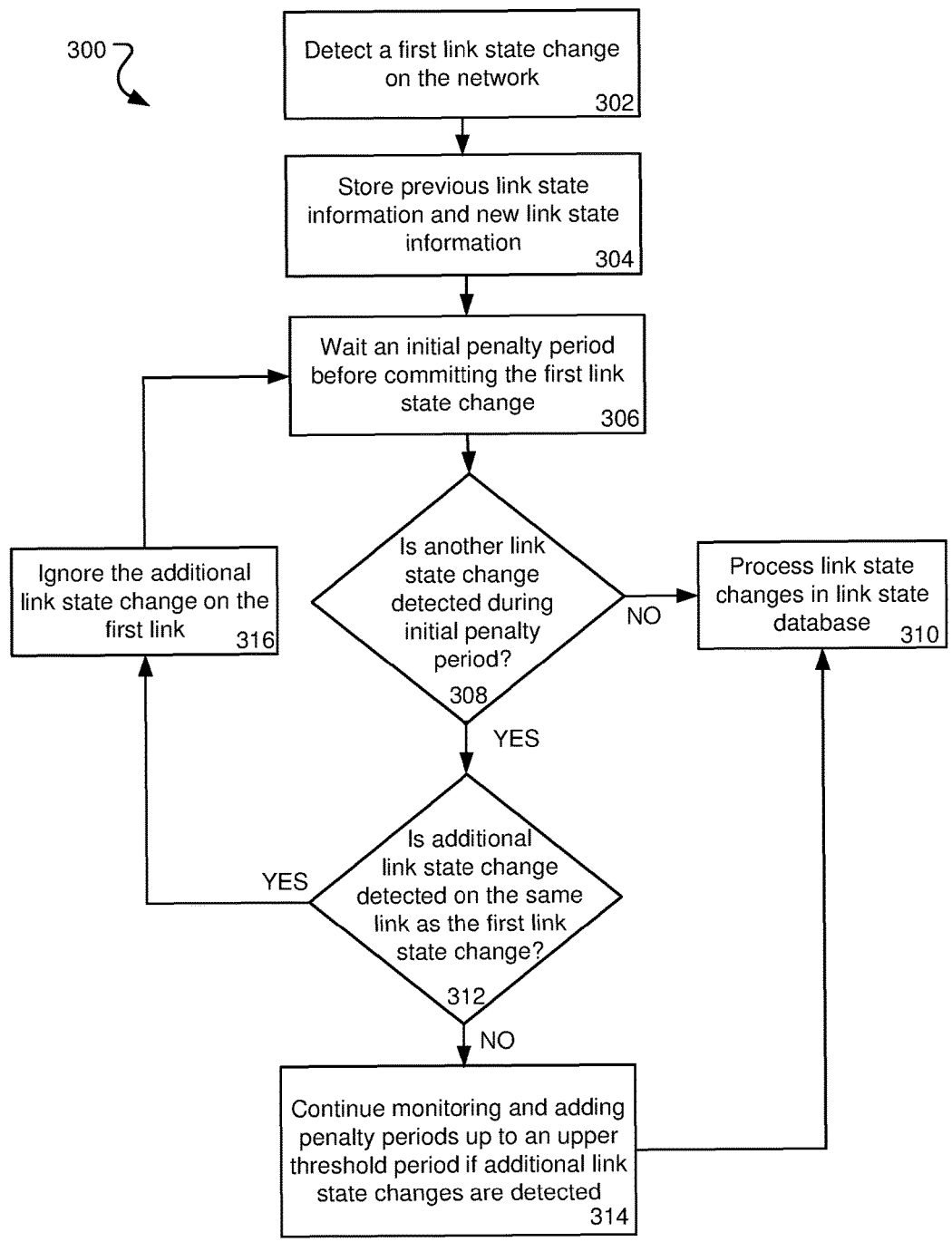
FIG. 3 is a flowchart illustrating a second method for a router of a telecommunications network to recalculate routing paths based on a link event.

FIG. 3 is a flowchart illustrating a second method for a router of a telecommunications network to recalculate routing paths based on a link event. Similar to the operations described above, the operations of FIG. 3 may be performed by a router or any other component of a telecommunications network. The method 300 provides for the router to apply one or more penalty periods to respond to a change in a link state, but also allows for ignoring link state changes that are related, such as a toggling of the state of a particular link in the link state database.

Beginning in operation 302, the router detects a first link state change on the network. As discussed above, the link state change may include a link going down or becoming available. Thus, to detect the link state change, the router may compare one or more received IGP messages of the link states to a previously received IGP message of the link states. Upon comparison, the router may determine that a link that was previously announced is no longer present in the list of links in the IGP message, or a link that was not previously announced is now present in the IGP message. In operation 304, the router may store the previous link state information (before the detection of the change in link state) and the new link state information in a database or other storage device. Storing the previous link state and the new link state may aid the router in determining whether related link state changes occur on the same link.

In operation 306, the router applies an initial penalty period before reacting to the change in link state. In one particular implementation, the initial penalty period may be 100 ms, although any period of time may be set as the initial penalty period. The initial penalty period is an amount of time in which the router does not update the link state database and/or calculate a shortest path route for a packet on the network. In operation 308, the router determines if another link state change is received during the initial penalty period. In one implementation, the router may wait until the initial penalty period elapses before comparing a previous link state database with a new link state database. In another implementation, the router may store all link state information received during the initial penalty period and analyze the received link state information once the initial penalty period has elapsed. If no additional link state changes are received during the initial penalty period, the router may process the first link state change in operation 310 by updating the link state database and/or calculating shortest routes between components of the network.

If another link state change is received during the initial penalty period, the router analyzes the additional link state change to determine if the additional link state change occurred on the same link as the first link change in operation 312. For example, the first link state change may occur on a link from Chicago to New York as received in one or more received IGP messages announcing links of the network. The first link state change may include the link not being present in the announced links from one or more other components of the network. Later, another link state change may be received by the router on the same Chicago to New York link. For example, the Chicago to New York link may once again appear in an announced link list from one or more components of the network. In this example, the detected link state changes occurred on the same link and may be noted by the router.

Although illustrated in FIG. 3 as the link state changes occurring on the same link, alternatively the router may determine if the additional link state change is related to the first link state change. For example, a networking component may be associated with several links in the link state database. The router may, in the method 300 of FIG. 3, determine that the first link state change and the additional link state change occurred on different links, but both links are associated with the same networking component. In such an instance, the router may treat the two link state changes as being related. In another example, a particular source network may be associated with several links such that stage changes on two or more of the links may be determined to be related through the particular source network. In this manner, the router may determine that any two received link state changes are related in some capacity and react to the received link state changes in a similar manner as if the link state changes occurred on the same link. In other words, although discussed herein as link state changes occurring on the same link, the operations described may apply for any link state changes that are related or the network/router determine are related.

If the router determines that the additional link state change occurred on a different link as the first link state change, the router may assume that the two link state changes are unrelated and, in operation 314, continue to monitor for additional link state changes and adding penalty periods until an upper threshold period if met as described above. Once no additional link state changes are detected or the upper threshold period expires, the router may process the link state changes in operation 310 by updating the link state database and/or calculating the shortest path for routes through the network.

However, if the router determines that the additional link state change occurred on the same link as the first link state change, the router may assume that the two link state changes are related. In this instance, the router may ignore the additional link state change for that particular link for the purposes of adding additional penalty periods in operation 316. In other words, the router may determine that the first link state change and the additional link state change are related (such as if the connection of the link is toggling). If the state changes are related, the router may choose to ignore the toggling link state changes and monitor for unique link state changes on the other links in the network. Thus, the router may return to operation 306 to wait until the initial penalty period elapses and determine if any unique link state change is received (operation 308). If not, the link state changes may be processed, including the link state changes of the toggling link, in operation 310 as described above. In this manner, the method 300 of FIG. 3 allows the router to ignore a toggling link (or other link state changes that are related) to prevent the router and other components of the network from being driven into the upper threshold penalty period by the toggling link. By dampening the effect of the toggling link, the network may process packets faster as each component is not waiting out the maximum penalty period.

Although illustrated in FIG. 3 as returning to an initial penalty period upon the detection of an additional link state change on the same link, other implementations of the method may also be performed by the router. For example, the router may start an additional initial penalty period upon detecting the additional link state change, may start a penalty period of any length of time upon detecting the additional link state change, or may immediately process all received link state changes upon detecting the additional link state change. In general, the router may respond to the additional link state change in any manner. Further, determining if the additional link state change is related to the first link state change may include accessing one or more stored link states to detect on which link one or more of previously received link state changes occurred. Such previously received link state changes may be stored in a database or other memory device.

Further, the response taken by the router upon detection of a second link state change on the same or related link may vary depending on the type of state change. For example, the removal of a link from the list of announced links may cause the router to respond more quickly than the addition of a link to the list. As the router may continue to route packets during a penalty period, some packets may be transmitted to a link that is malfunctioning or is no longer available to carry traffic. While the network may have mechanisms in place to handle packets transmitted on a link that is malfunctioning, such mechanisms may consume network processing power and negatively affect the performance of the network. Thus, if the router detects a link state change that indicates that the link is going down, the router may respond quickly to such a detected state change. In one example, the router may immediately respond to this type of link state change or apply a penalty period that is less than other penalty periods. Alternatively, if the detected link state change indicates that a new link is available for packet transmission, the router may apply a longer penalty period as the presence of a new link will not negatively affect the performance of the network. Further, applying different types of penalty periods may be used by the router while performing the operations of FIG. 3, or may be applied separate from the operations of FIG. 3. In the implementation where a penalty period is applied based on the type of detected link state change, the router may determine not only the link on which the additional link state change occurred, but the type of link state change. The type of link state change may then determine if the link state changes are immediately processed by the router, or a typical or longer penalty period is applied before processing the changes.

Through the operations described above, a router or other networking device may determine the nature of the link event and the link upon which the event occurred. If the link event is unrelated to a previous link event, the component may calculate the shortest route from the link state database immediately or after an initial penalty phase. However, if the link event is on the same link or in some way related to a previously detected link event, the component may ignore the occurrence of the received link event in determining when the shortest route path is calculated. As such, the implementation effectively ignores a toggling link when applying a dampening effect to the calculation of the shortest route such that the network can respond to a singular link event faster than when a traditional dampening effect with exponential back-off is applied.

Figure 4:
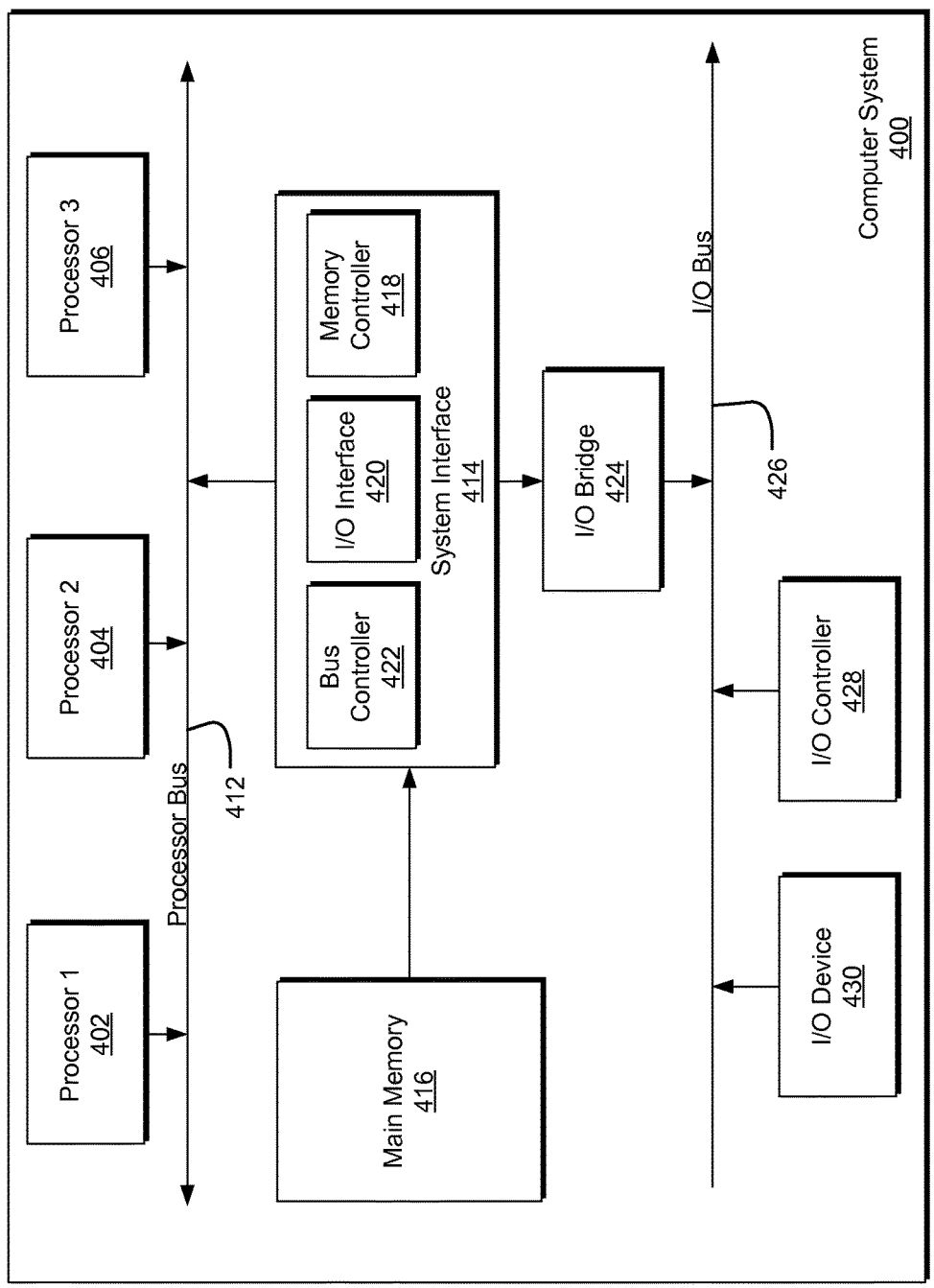
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be used to implement the routing components 140, 146 of the network 102 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 440, as illustrated.

I/O device 440 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for operating a telecommunications network, the method comprising:
 maintaining a link state database in a storage device, the link state database comprising a state of a plurality of links between a plurality of routers of the telecommunications network;
 detecting a change in the state of at least a first of the plurality of links of the link state database at a first time;
 applying an initial penalty time period to delay processing of the change in the state of at least a first of the plurality of links of the link state database;
 receiving an indication of a change in the state of at least a second of the plurality of links of the link state database at a second time, the second time occurring after the first time and during the initial penalty time period; and
 processing the change in the state of the first of the plurality of links of the link state database and the change in the state of at least the second of the plurality of links of the link state database after the initial penalty time period when the first of the plurality of links of the link state database is the same link as the second of the plurality of links of the link state database.

2. The method of claim 1 further comprising:
 applying an additional penalty time period for processing the change in the state of at least the first of the plurality of links of the link state database and the change in the state of at least the second of the plurality of links of the link state database when the first of the plurality of links of the link state database is not the same link as the second of the plurality of links of the link state database.

3. The method of claim 1 wherein the additional penalty time period is twice the initial penalty time period.

4. The method of claim 1 wherein processing the change in the state of the first of the plurality of links of the link state database and the change in the state of at least the second of the plurality of links of the link state database comprises updating the link state database with the change in state of the first of the plurality of links and the change in state of the second of the plurality of links.

5. The method of claim 1 wherein the change in the state of at least the first of the plurality of links of the link state database comprises the first of the plurality of links of the link state database becoming undetectable by the telecommunications network.

6. The method of claim 5 wherein the change in the state of at least the second of the plurality of links of the link state database comprises the second of the plurality of links of the link state database becoming detectable by the telecommunications network.

7. A telecommunications network comprising:
 a plurality of communication links between a plurality of routers of the telecommunications network;
 a router receiving announcements from one or more of the plurality of routers of the telecommunications network, each announcement comprising state information for a subset of the plurality of communication links; and
 a link state database maintained by the router storing the received state information for the plurality of communication links of the telecommunications network;
 wherein the router, in response to receiving the announcements:
  detects a change in the state of at least a first of the plurality of communication links at a first time;
  applies an initial penalty time period to delay processing of the change in the state of at least a first of the plurality of communication links;
  receives an indication of a change in the state of at least a second of the plurality of communication links at a second time, the second time occurring after the first time and during the initial penalty time period; and
  processes the change in the state of the first of the plurality of communication links and the change in the state of at least the second of the plurality of communication links after the initial penalty time period when the first of the plurality of communication links is the same link as the second of the plurality of communication links.

8. The telecommunication network of claim 7 wherein each announcement comprises an Internal Gateway Protocol (IGP) announcement from at least one of the plurality of routers of the telecommunications network.

9. The telecommunications network of claim 7 wherein the router further applies an additional penalty time period for processing the change in the state of at least the first of the plurality of communication links and the change in the state of at least the second of the plurality of communication links when the first of the plurality of communication links is not the same link as the second of the plurality of communication links.

10. The telecommunications network of claim 7 wherein processing the change in the state of the first of the plurality of communication links and the change in the state of at least the second of the plurality of communication links comprises updating the link state database with the change in state of the first of the plurality of communication links and the change in state of the second of the plurality of communication links.

11. The telecommunications network of claim 7 wherein the change in the state of at least the first of the plurality of communication links comprises the first of the plurality of communication links becoming undetectable by the telecommunications network.

12. The telecommunications network of claim 11 wherein the change in the state of at least the second of the plurality of communication links comprises the second of the plurality of communication links database becoming detectable by the telecommunications network.

13. A router comprising:
a network communication port to receive an announcement over a telecommunications network, the announcement comprising state information of a plurality of links between a plurality of routers of the telecommunications network;
a processor; and
a memory device in communication with the processor for storing one or more instructions that, when executed by the processor, cause the router to perform the operations of:
maintaining a link state database comprising received state information of the plurality of links between the plurality of routers of the telecommunications network from at least the announcement;
detecting a change in the state of at least a first of the plurality of links of the link state database at a first time;
applying an initial penalty time period to delay processing of the change in the state of at least a first of the plurality of links of the link state database;
receiving an indication of a change in the state of at least a second of the plurality of links of the link state database at a second time, the second time occurring after the first time and during the initial penalty time period; and
processing the change in the state of the first of the plurality of links of the link state database and the change in the state of at least the second of the plurality of links of the link state database after the initial penalty time period when the first of the plurality of links of the link state database is the same link as the second of the plurality of links of the link state database.

14. The router of claim 13 wherein the router further applies an additional penalty time period for processing the change in the state of at least the first of the plurality of links of the link state database and the change in the state of at least the second of the plurality of links of the link state database when the first of the plurality of links of the link state database is not the same link as the second of the plurality of links of the link state database.

15. The router of claim 13 wherein the change in the state of at least the first of the plurality of links of the link state database comprises the first of the plurality of links of the link state database becoming undetectable by the telecommunications network.

16. The router of claim 15 wherein the change in the state of at least the second of the plurality of links of the link state database comprises the second of the plurality of links of the link state database becoming detectable by the telecommunications network.

* * * * *